(12) United States Patent
Inui et al.

(10) Patent No.: US 6,577,822 B2
(45) Date of Patent: Jun. 10, 2003

(54) MAINTENANCE METHOD FOR IMAGE FORMING SYSTEM AND IMAGE FORMING APPARATUS EMPLOYED IN SAID IMAGE FORMING SYSTEM

(75) Inventors: Kazuo Inui, Itami (JP); Atsushi Tomita, Toyohashi (JP); Yoshikazu Ikenoue, Itami (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/234,183

(22) Filed: Sep. 5, 2002

(65) Prior Publication Data

US 2003/0049034 A1 Mar. 13, 2003

(30) Foreign Application Priority Data

Sep. 10, 2001 (JP) ........................................ 2001-273647

(51) Int. Cl.[7] .............................................. G03G 15/00
(52) U.S. Cl. ................................ 399/11; 399/8; 399/9; 399/15
(58) Field of Search ............................. 399/8, 9, 11, 15, 399/81; 358/296, 300, 406, 504; 700/9

(56) References Cited

U.S. PATENT DOCUMENTS 5,666,585 A  *  9/1997  Nagira et al. ................. 399/10
6,370,341 B1 *  4/2002  Haines ......................... 399/81
2002/0025172 A1 * 2/2002  Tsuda et al. .................... 399/8

FOREIGN PATENT DOCUMENTS

| JP | 05338321 A | * 12/1993 |
| JP | 10-026909 | 1/1998 |
| JP | 2000-039815 | 2/2000 |
| JP | 2001-166968 | 6/2001 |

* cited by examiner

Primary Examiner—Arthur T. Grimley
Assistant Examiner—Candice C. Campbell
(74) Attorney, Agent, or Firm—Burns, Doane, Swecker & Mathis, LLP

(57) ABSTRACT

In a printer in a system comprising multiple printers connected to a LAN, the service technician executes certain diagnostic adjustment through the operation of keys on the operation unit. When this is done, the controller of the printer generates a script that describes that the same service as indicated via the key input by the service technician in this diagnostic adjustment episode should be executed. The generated script is sent to the other printers. Each printer that receives the script automatically executes diagnostic adjustment based on the description of the script. As a result, the same diagnostic adjustment tasks as those executed regarding the printer from which the script was received is performed on each printer that received the script.

10 Claims, 18 Drawing Sheets

MAINTENANCE METHOD FOR IMAGE FORMING SYSTEM AND IMAGE FORMING APPARATUS EMPLOYED IN SAID IMAGE FORMING SYSTEM

The present application claims priority to Japanese Patent Application No. 2001-273647 filed Sep. 10, 2001, the entire content of which is hereby incorporated by reference.

BACKGROUND OF THE INVENTION

1. Field of the Invention

The present invention relates to a maintenance method for an image forming system and to an image forming apparatus such as a printer employed in such image forming system.

2. Description of the Related Art

In recent years, systems in which multiple clients and multiple printers are connected in offices over a LAN (local area network) and the clients share the printers have been introduced in increasing numbers.

In conventional printers, for maintenance purposes, test prints can normally be output in order to assess the image quality, and the image density and colors can be adjusted via key input operations from the operation panel of the printer.

If a service technician seeks to have each printer connected to such system perform test printing in order to assess the image quality, for example, the technician must perform key input operations on each printer to enable such output. Where there are many printers, the performance of such operations is troublesome and time-consuming. In addition, where an adjustment such as a reduction in image density beyond the normal level for each printer is to be made based on a request by the administrator of the system, such adjustment must be performed for each printer, which is similarly troublesome and time-consuming.

SUMMARY OF THE INVENTION

A main object of the present invention is to provide a maintenance method that can reduce to the extent possible the amount of work that must be performed by the service technician during maintenance of image forming apparatuses such as printers that comprise, while being connected to a network such as a LAN, an image forming system, as well as to provide an image forming apparatus used in connection with such maintenance method.

In order to attain this and other objects, according to one aspect of the present invention, the maintenance method for an image forming system comprising first and second image forming apparatuses connected over a network includes a receiving step in which the first image forming apparatus receives input operations for maintenance purposes from the service technician; a first execution step in which maintenance work for the first image forming apparatus is executed based on the contents of the received input operations; a generation step in which an order is generated that indicates that the same maintenance work as that performed based on the contents of the received input operations should be executed; a transmission step in which the generated order is sent to the second image forming apparatus; and a second execution step in which, when the order sent from the first image forming apparatus is received by the second image forming apparatus, the same maintenance work as that performed by the first image forming apparatus is executed based on such order.

It is preferred that the maintenance work be executed in the second execution step when the image forming apparatus is in standby status.

It is furthermore preferred that the maintenance work be executed in the second execution step when no processing that relates to maintenance servicing is being performed.

It is moreover preferred that an obtaining step in which information regarding the skill of the service technician for the current maintenance session and the skill of the service technician for the previous maintenance session is obtained, both of the maintenance sessions having been performed regarding the first image forming apparatus, and a determination step in which it is determined whether or not the service technician for the current maintenance session has superior skill to the service technician for the previous maintenance session be included, wherein the order is sent to the second image forming apparatus in the transmission step when it is determined that the service technician for the current maintenance session has a higher level of skill than the service technician for the previous maintenance session.

According to another aspect of the present invention, the maintenance method for an image forming system comprising an administrating apparatus, a first image forming apparatus and a second image forming apparatus connected over a network includes a receiving step in which the first image forming apparatus receives input operations for maintenance purposes from the service technician; a first execution step in which maintenance work for the first image forming apparatus is executed based on the contents of the received input operations; a generation step in which an order is generated that indicates that the same maintenance work as that performed based on the contents of the received input operations should be executed; a transmission step in which the generated order is sent to the administrating apparatus; a forwarding step in which, when the order is received from the first image forming apparatus, the administrating apparatus sends such order to the second image forming apparatus; and a second execution step in which, when the order is received from the administrating apparatus, the second image forming apparatus executes the same maintenance work as that performed by the first image forming apparatus based on such order.

It is preferred that an identification information receiving step in which the first image forming apparatus receives input of the information that identifies the service technician, an identification information sending step in which such service technician identification information is sent to the administrating apparatus, and an output step in which the description of the service technician identification information sent from the administrating apparatus is output by the second image forming apparatus be included, wherein the service technician identification information is sent to the second image forming apparatus together with the order from the first image forming apparatus in the forwarding step.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

Embodiments of the present invention in which printers are used as examples of image forming apparatuses are described below with reference to the drawings.

First Embodiment

Figure 1:
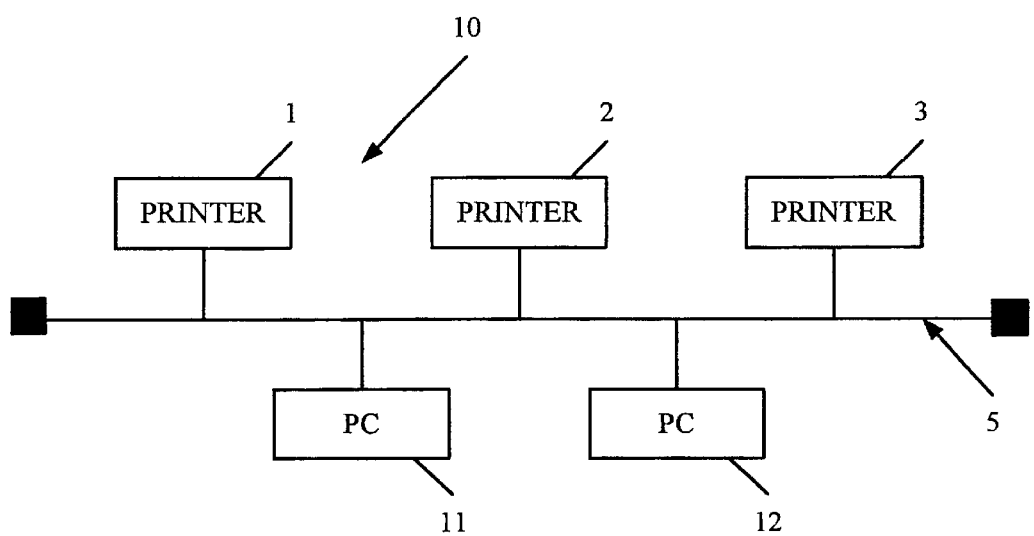
FIG. 1 is a drawing showing the construction of a system 10 including printers pertaining to a first embodiment of the present invention.

FIG. 1 is a drawing showing the construction of a system 10 that includes printers pertaining to the present invention.

As shown in the drawing, this system 10 comprises PC's (personal computers) 11 and 12 and clients or printers 1, 2 and 3 that are connected over a network 5, which comprises a LAN in this example.

The printer 1 is an apparatus that forms images using the public-domain electrophotography method based on image data sent from the PC 11 or the PC 12, and the construction thereof applies to the printers 2 and 3 as well. The constructions of the printers and the PC's are described below, and because the printers 1 through 3 share the same construction, only the printer 1 is used in the description and the printers 2 and 3 are omitted. Similarly, because the PC 11 and the PC 12 share the same construction, the description uses only the PC 11, and the PC 12 is omitted. In addition, while an example in which three printers are connected to the LAN 5 is shown in the drawing, the present invention is not limited to this implementation. Any construction is acceptable as long as multiple printers are connected over a network.

Figure 2:
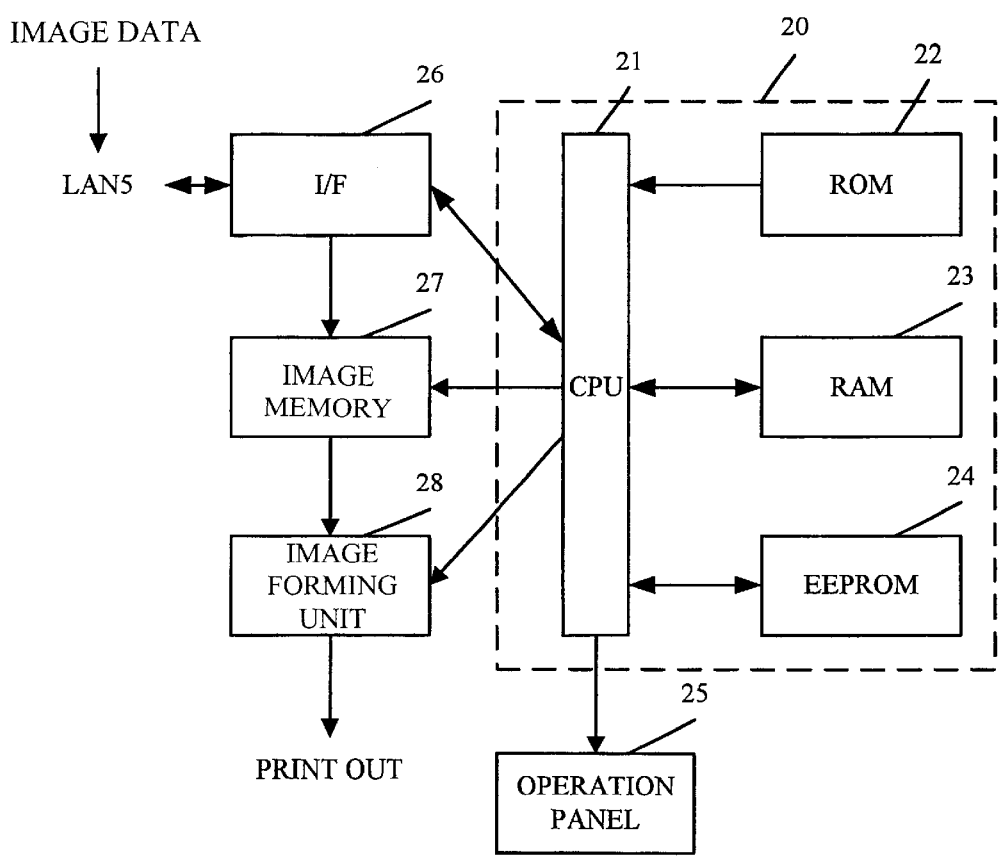
FIG. 2 is a drawing showing an example of the hardware construction of the printer 1.

FIG. 2 is a drawing showing the hardware construction of the printer 1.

As shown in the drawing, the printer 1 includes a controller 20, an operation panel 25, an interface (I/F) 26, an image memory 27 and an image forming unit 28.

The controller 20 includes a CPU 21, a ROM 22, a RAM 23 that provides a work area and an EEPROM 24.

The ROM 22 stores programs such as that used for the script operation described below. The CPU 21 reads out various programs from the ROM 22 for execution, and controls the entire image forming operation conducted by the printer 1. The EEPROM 24 is a non-volatile memory, and stores the apparatus identification number described below.

The operation panel 25 includes keys and other components that are used when the mode by which to perform diagnostic adjustment for maintenance purposes is activated.

The I/F 26 is an interface by which to connect the printer 1 to the LAN 5. It receives the image data sent from the PC 11 or the like over the LAN 5, and causes such image data to be stored in the image memory 27.

The image forming unit 28 reads out the image data from the image memory 27 upon receiving a command from the CPU 21, and performs scanning exposure of the photoreceptor drum (not shown) using the print head (not shown). It then develops the electrostatic latent image formed on the photoreceptor drum via the scanning exposure using toner, and reproduces the image on a sheet of paper by transferring the toner image thereto.

The image forming unit 28 includes a fusing device (not shown) by which to fuse the image onto the sheet of paper, and the printer 1 has a capability to automatically shift from a standby state in which the fusing device is kept at the fusing temperature used for fusing to a so-called energy conservation state in which energy consumption is reduced by keeping the fusing device at a lower temperature than the fusing temperature. In this example, the energy conservation mode is activated when processing such as printing is not performed while the printer is in the standby state for a prescribed period, upon the expiration of which the energy conservation state is triggered to ON.

Figure 3:
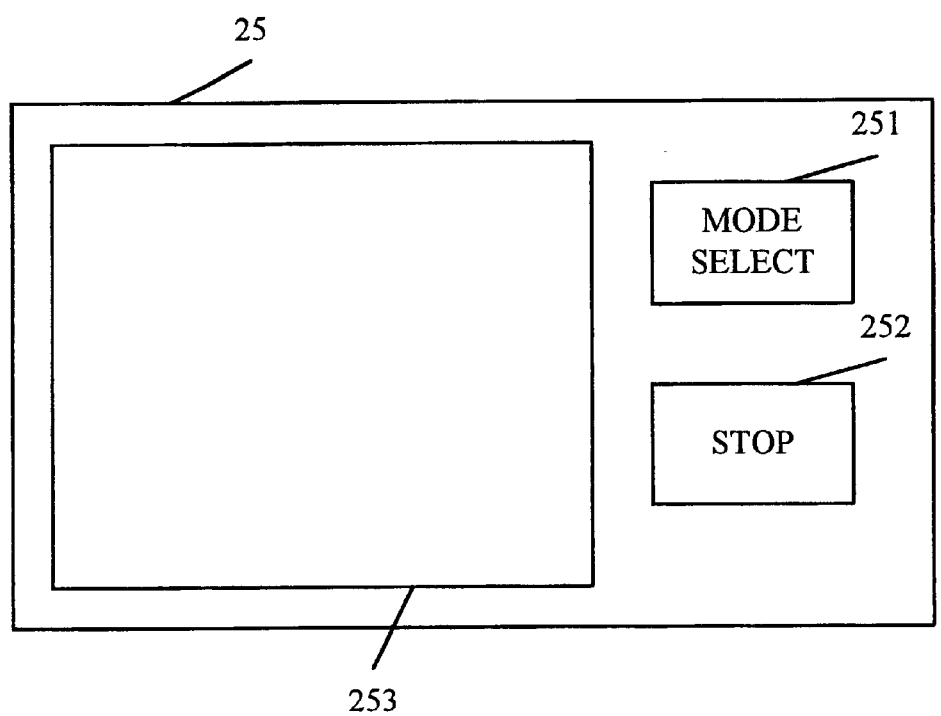
FIG. 3 is a drawing showing the construction of the operation panel 25 of the printer 1.

FIG. 3 is a drawing showing the construction of the operation panel 25.

As shown in the drawing, the operation panel 25 includes a mode select key 251, a stop key 252 and a display 253.

The mode select key 251 is a key used to shift to the diagnostic adjustment mode.

The display 253 is a display device that includes an LCD display screen as well as a touch panel on the display screen.

The CPU 21 switches the printer 1 between the print mode (in which regular image forming operations are performed) and the diagnostic adjustment mode (in which diagnostic adjustment is performed) each time the mode select key 251 is pressed, and causes the display 253 to display a screen that corresponds to the activated mode.

Figure 4:
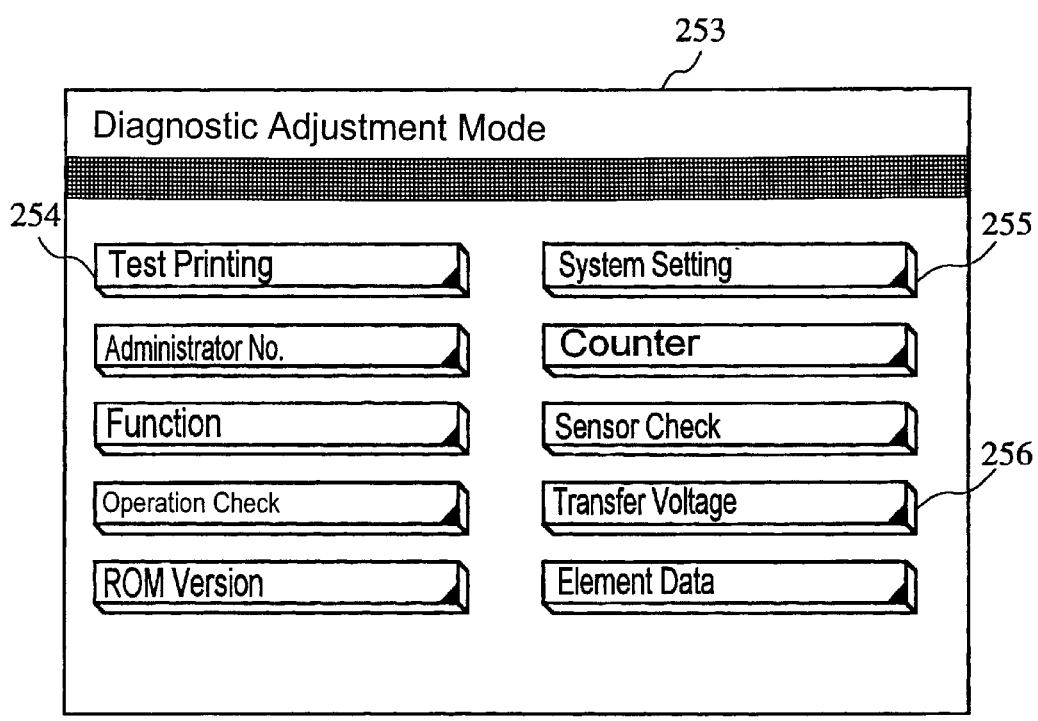
FIG. 4 is a drawing showing an example of the menu screen that is displayed on the display 253 of the operation panel 25 when the diagnostic adjustment mode is activated.

FIG. 4 is a drawing showing an example of the menu screen that is displayed on the display 253 when the diagnostic adjustment mode is activated. Various diagnostic adjustment tasks such as 'test printing' that can be executed are displayed as keys on the screen. The service technician, who performs maintenance, can execute any of the maintenance tasks by touching the key for the desired maintenance task, i.e., the 'test printing' key 254 if 'test printing' is desired, for example. When the 'test printing' key 254 is pressed, the CPU 21 executes the routine (test printing) by which to print out and output onto a sheet of paper a prescribed test pattern for image assessment.

When the 'transfer voltage' key 256 is pressed, a screen by which to receive the input to set the transfer voltage is displayed, and when the voltage value is specified by the service technician, the value stored in the EEPROM 24 as the current transfer voltage value is replaced by the specified value, and at the same time control is performed such that images are transferred during the transfer process of subsequent printing operations based on that voltage value. The same principle applies to the other key items, and the service operation represented by the key name is executed when each key is pressed.

Returning to FIG. 3, the stop key 252 is used to stop the operation being performed, such as test printing, for example.

Figure 5:
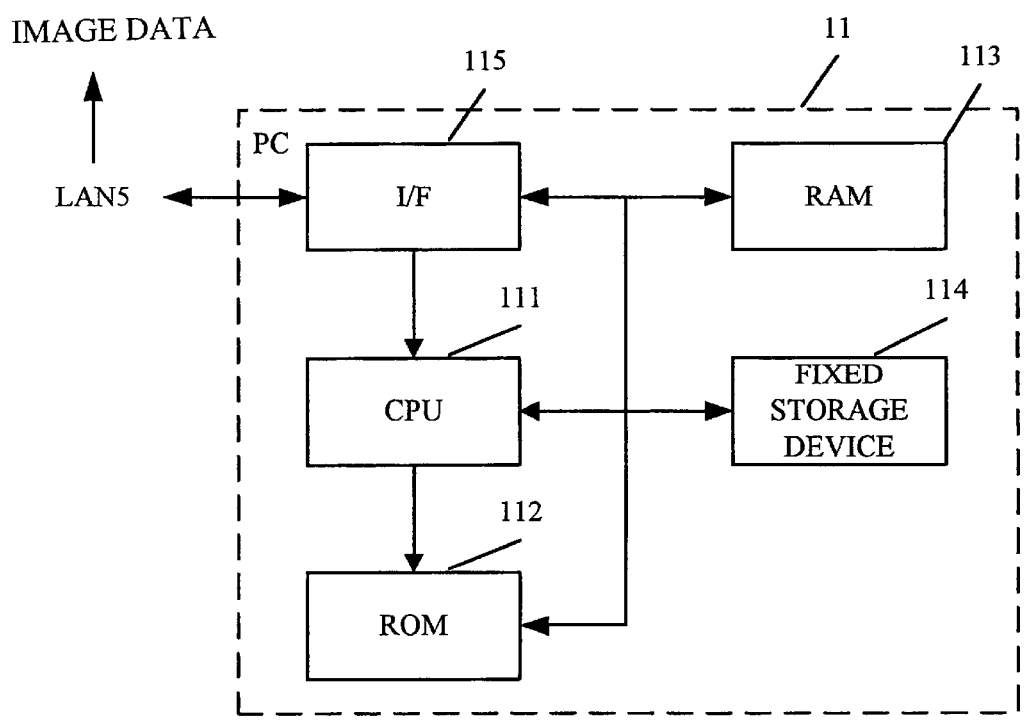
FIG. 5 is a drawing showing the hardware construction of the PC 11.

FIG. 5 is a drawing showing the hardware construction of the PC 11.

As shown in the drawing, the PC 11 includes a CPU 111, a ROM 112, a RAM 113 that provides various work areas, a fixed storage device 114 comprising a hard disk, and an interface (I/F) 115. Application programs such as the program used for document editing, a printer driver and the like are stored in the ROM 112, and the CPU 111 executes these programs. The I/F 115 is an interface by which to connect the PC 11 to the LAN 5, and sends image data for created documents or the like to the printer 1 or other apparatus.

Figure 6:
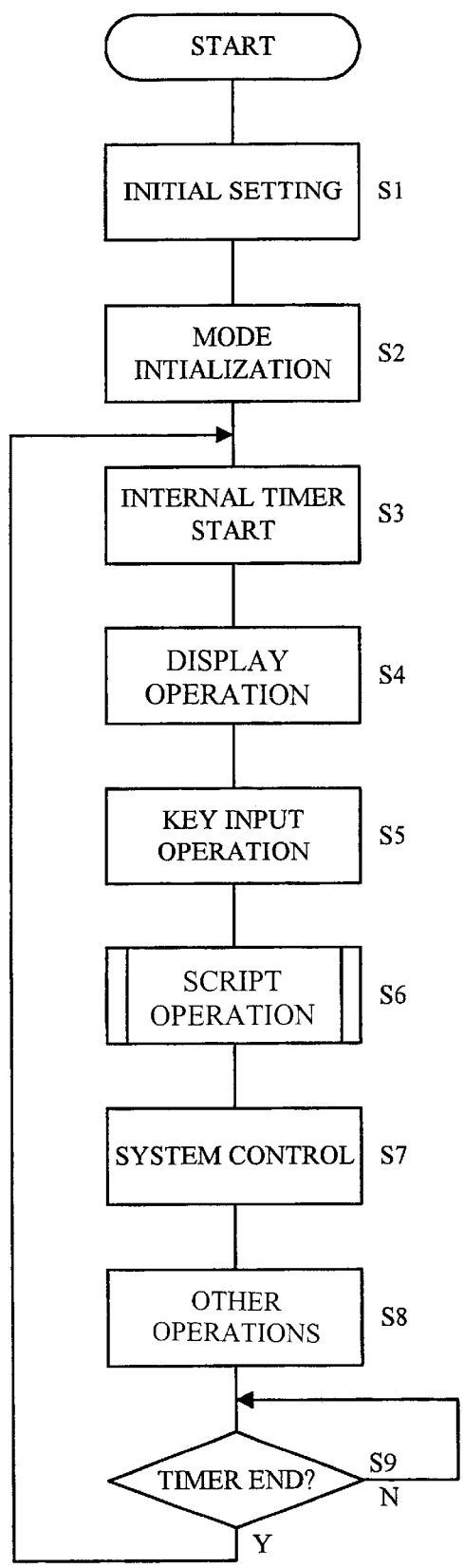
FIG. 6 is a flow chart showing the sequence of the operations executed by the CPU 21 of the controller 20 of the printer 1.

FIG. 6 is a flow chart showing the sequence of the operations executed by the CPU 21 of the controller 20 of the printer 1.

As shown in the drawing, when the power is turned ON, the CPU 21 initializes the RAM 23 and performs initial setting of the various registers and other components (step SI). It also performs mode initialization by which the print mode is activated in the printer 1 (step S2).

The internal timer is then begun (step S3), and a display operation to control the display screen of the display 253 of the operation panel 25 is executed (step S4).

A key input operation to receive inputs from the mode select key 251 or other keys on the operation panel 25 and from the touch panel on the display 253 is then performed (step S5). The CPU 21 temporarily stores the information input via these keys in the diagnostic adjustment mode (i.e., the information that indicates which keys were pressed, hereinafter referred to as 'operation information') in the operation buffer of the RAM 23, and the stored information is read out in the script operation of step S6. Where the diagnostic adjustment mode is activated by the pressing of the mode select key 251, a script generation request flag that indicates such activation is turned ON, and when the print mode is reactivated, on the other hand, the script generation request flag is turned OFF.

The script operation is then executed (step S6). The details of this operation are described below.

After the script operation is carried out, the CPU 21 performs operation control based on the information received via the key input operation of step S5. For example, where the 'test printing' key 254 is pressed, test printing is executed. Where image data is received from the PC 11 or the like, system control is executed in which an image forming operation based on that image data is performed, for example (step S7). Subsequently, other operations are performed (step S8), and when the internal timer elapses ('Y' in step S9), the CPU 21 returns to step S3 and repeats the operations from steps S3 through S9.

Figure 7:
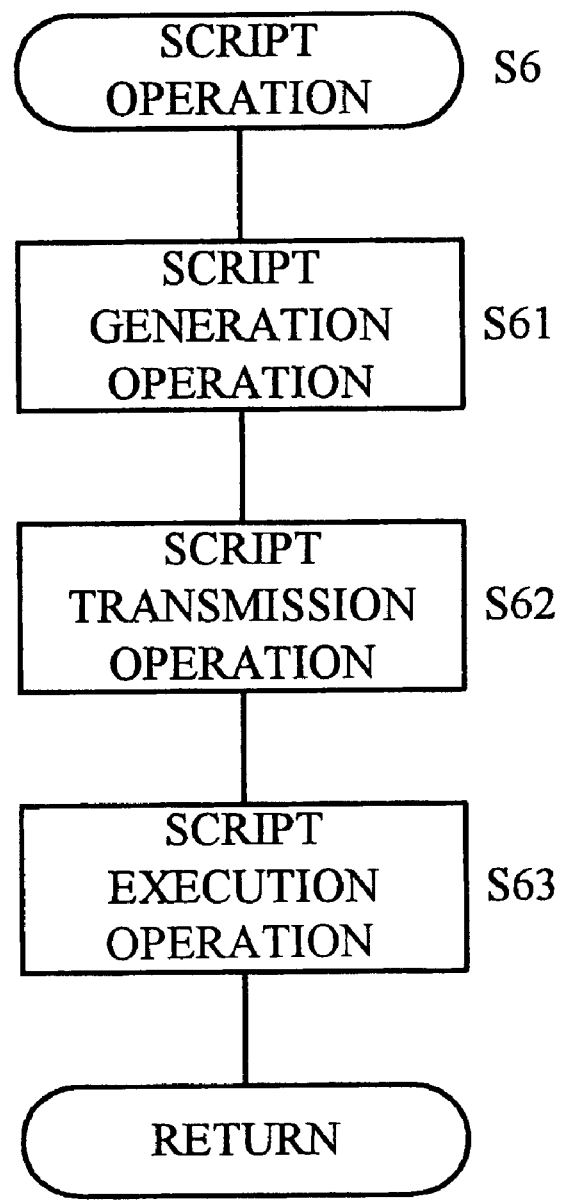
FIG. 7 is a flow chart showing the sequence of events of the script operation of step S6.

FIG. 7 is a flow chart showing the sequence of events of the script operation of step S6.

As shown in the drawing, the script operation comprises a script generation operation (step S61), a script transmission operation (step S62) and a script execution operation (step S63), which are carried out sequentially.

In the script generation operation, an order is generated that indicates that processing based on the information received via key input by the service technician in the diagnostic adjustment mode should be executed, i.e., when the 'test printing' key 254 is pressed, an order that indicates that the processing for test printing should be executed (the information including this order is hereinafter referred to as a 'script') is generated.

The script transmission operation is a process in which the generated script is sent to specified recipients.

In the script execution operation, the script sent from another printer is received and the information described in the script is executed. Specifically, where an order for execution of test printing is described in the script, the operations that should be executed when the 'test printing' key 254 is pressed, i.e., test printing, are performed. A script is generated via the script generation operation only for the menu items available in the diagnostic adjustment mode, the processing for which items may be executed in other printers. In this example, a script is generated for 'test printing', 'operation verification, 'ROM version display', 'sensor check', 'transfer voltage setting' and 'element data display'.

The sequences for each operation are described below.

Figure 8:
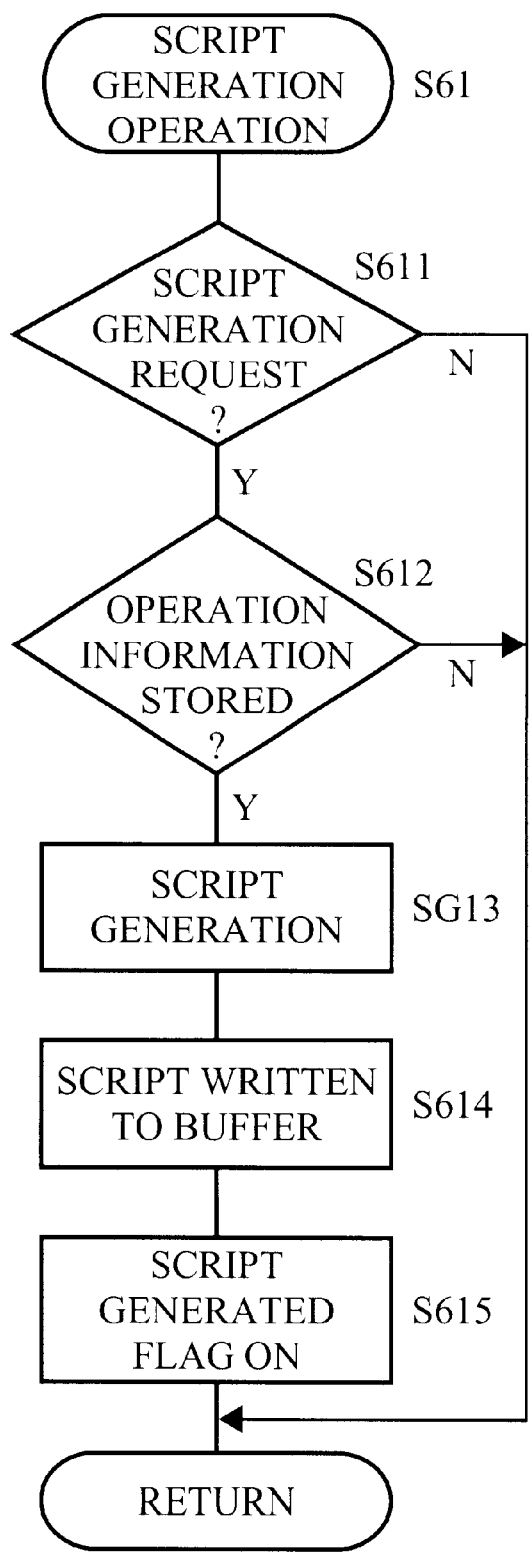
FIG. 8 is a flow chart showing the sequence of events of the script generation operation of step S61.

FIG. 8 is a flow chart showing the sequence of events of the script generation operation of step S61.

As shown in the drawing, the CPU 21 determines whether or not a script generation request has been issued (step S611). This determination is made based on whether the script generation request flag is ON or OFF. In other words, where this flag is ON, it is determined that the diagnostic adjustment mode is active and that a script generation request has been issued. On the other hand, where this flag is OFF, it is determined that the print mode is active and that a script generation request has not been issued.

Where it is determined that a script generation request exists ('Y' in step S611), it is determined whether or not operation information regarding any of the menu items for which a script may be generated is stored in the RAM 23 (step S612).

Where it is determined that operation information is stored ('Y' in step S612), a script that describes that information is generated (step S613). For example, where the input of the 'test printing' key 254 was received in the key input operation of step S5, information that indicates that the 'test printing' key was pressed is stored in the operation buffer. The CPU 21 reads out this information from the operation buffer in step S613, and generates a script that describes an order to execute test printing.

The script thus generated is written to a script holding buffer in the RAM 23 for storage (step S614), and at the same time, a script generated flag that indicates that a script is saved is turned ON (step S615) and the CPU 21 returns to the main routine.

This script generation operation is repeatedly executed for as long as a script generation request exists in the process of the repeated execution of steps 54 through 57. For example, where an input to set the transfer voltage value via the 'transfer voltage' key 256 is received after test printing is carried out, 'an order to replace the transfer voltage value with the input value' is written in steps S613 and S614 in the line next to the line in which 'an order to execute test printing' is described in the script holding buffer.

In other words, so long as a script generation request exists, an order based on the information regarding the operation conducted by the service technician is added to the script holding buffer each time a key input is received. In this way, the procedure for diagnostic adjustment or for setting for maintenance purposes is generated as a script based on the operations actually performed during maintenance service. Therefore, the service technician can continue the maintenance work without performing special input to generate a script for the work regarding each diagnostic adjustment task. When the service technician switches the mode from the diagnostic adjustment mode to the print mode, the script request flag is turned OFF, as described above, and therefore it is determined that no script generation request exists ('N' in step S611), and no more script is generated.

Figure 9:
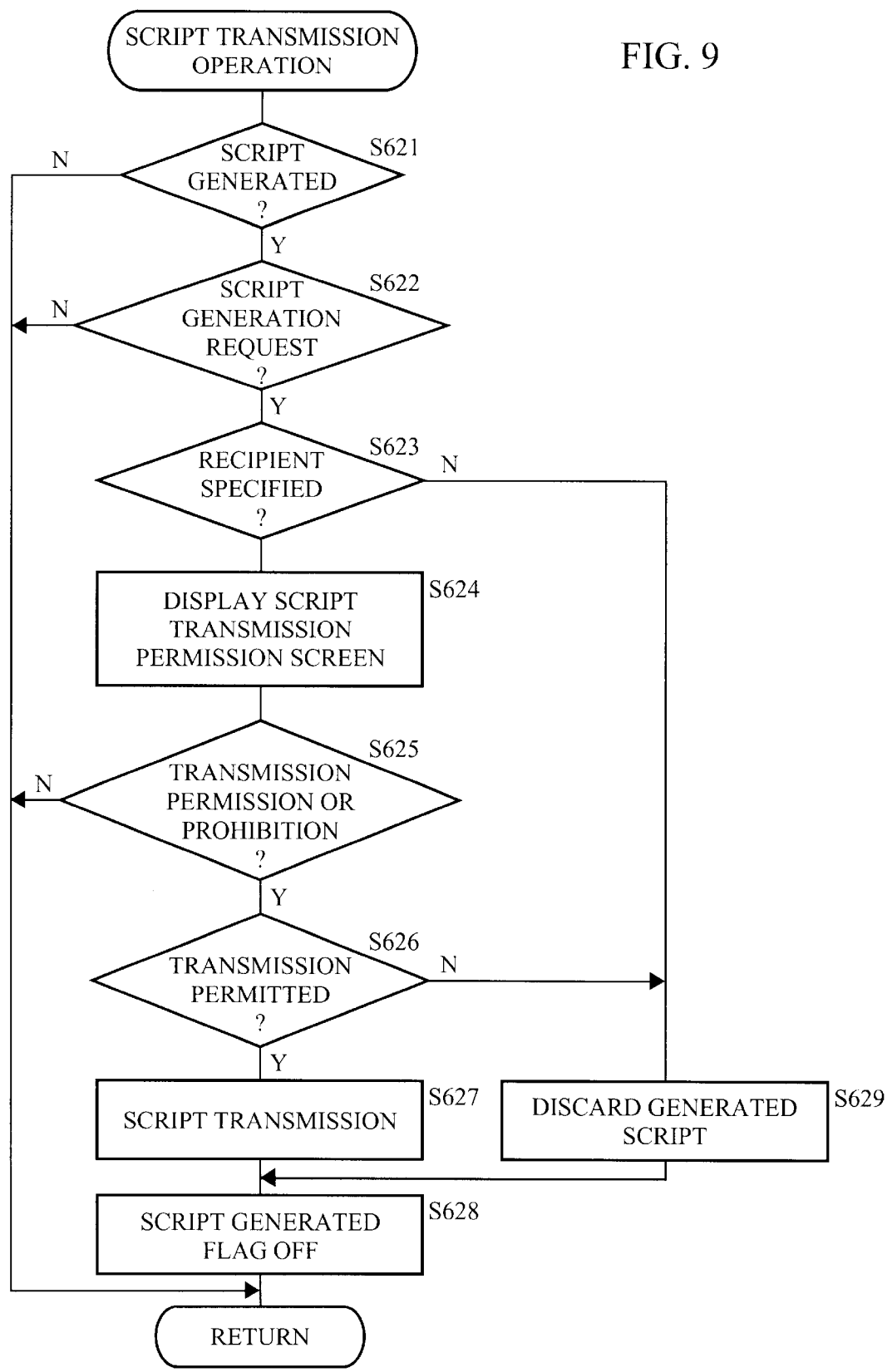
FIG. 9 is a flow chart showing the sequence of events of the script transmission operation of step S62.

FIG. 9 is a flow chart showing the sequence of events of the script transmission operation of step S62.

As shown in the drawing, it is first determined whether or not a script has been generated (step S621). This determination is made by verifying the ON/OFF status of the script generated flag.

Where it is determined here that the script generated flag is ON ('Y' in step S621), it is determined whether or not a script generation request still exists (step S622). This determination is made by verifying the ON/OFF status of the script request flag. Where it is determined that the script request flag is ON, i.e., that the diagnostic adjustment mode is activated ('N' in step S622), the CPU 21 determines that diagnostic adjustment is currently underway and that script generation has not been completely finished, and returns to the main routine.

On the other hand, where it is determined that the script request flag is OFF, i.e., that the print mode is active ('Y' in step S622), the CPU 21 determines that script generation has been finished and moves to step S623.

In step S623, it is determined whether or not recipients for the generated script are specified. This specification of recipients is carried out using the setting menu (not shown) that becomes available when the 'system setting' key 255 is pressed in the diagnostic adjustment mode, and the specified recipients are saved in the EEPROM 24. In this example, it is assumed that the printers 2 and 3 are specified as recipients in advance. Where it is determined that recipients are specified ('Y' in step S623), the CPU 21 moves to step S624.

In step S624, the CPU 21 causes the display 253 to display the script transmission permission screen.

Figure 10:
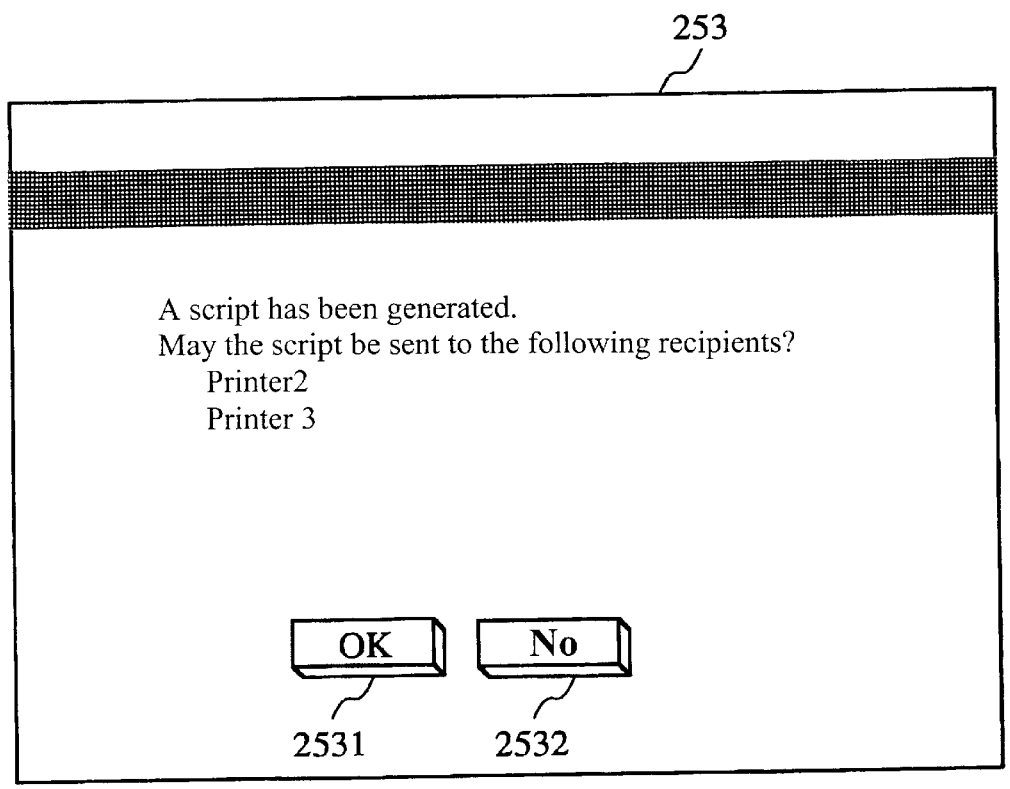
FIG. 10 is a drawing showing an example of the script transmission permission screen.

FIG. 10 is a drawing showing an example of the script transmission permission screen. As shown in the drawing, this screen is used to tell the service technician that a script has been generated and to ask the service technician whether or not the script may be sent to the specified recipients. An 'OK' key 2531 and an 'NO' key 2532 are displayed together on the screen. When the 'OK'0 key 2531 is pressed by the service technician, the CPU 21 turns ON a transmission permitted flag that indicates permission for transmission, and when the 'NO' key 2532 is pressed, the CPU 21 turns ON a transmission prohibited flag that indicates that transmission is prohibited. Where neither key is pressed, both the transmission permitted flag and the transmission prohibited flag are OFF.

Returning to FIG. 9, it is determined in step S625 whether or not an instruction to permit or prohibit transmission has been issued. This determination is made by verifying whether the transmission permitted flag is ON, the transmission prohibited flag is ON or both of the flags are OFF. Where both of the flags are OFF, that means that neither the 'OK' key 2531 nor the 'NO' key 2532 has been pressed by the service technician, and therefore it is determined that no instruction regarding transmission permission or prohibition has been issued ('N' in step S625), and the CPU 21 returns to the main routine. In this case, where the 'OK' key 2531 is pressed in the key input operation of step S5 after the main routine is carried out once, for example, the CPU 21 determines that 'Y' is the status in step 8625 and that transmission is permitted ('Y' in step 8626), sequentially sends the script to the specified recipients (the printers 2 and 3 in this example) (step 8627), and moves to step S628.

On the other hand, where the 'NO' key 2532 is pressed, for example, it is determined that transmission is prohibited ('N' in step S626), and the CPU 21 performs processing to discard (delete) the generated script in place of the script transmission operation of step 8627 (step 8629), and moves to step 5628.

In step S628, the script generated flag as well as the transmission permitted flag and the transmission prohibited flag are turned OFF, whereupon the CPU 21 returns to the main routine.

On the other hand, where no recipients are specified in step S623, transmission cannot be performed. Therefore, the CPU 21 moves to step S629 and discards the generated script.

The script is transmitted only when such transmission is permitted by the service technician in the example described above, but it is also acceptable, for example, if the script is automatically sent without the service technician's permission when recipients are specified. In this way, it is no longer necessary to input via the script transmission permission screen whether transmission is permitted, and the amount of work performed by the service technician is reduced accordingly.

It is also acceptable if the printers to which the script should be sent are selected from among the printers displayed as possible recipients on the script transmission permission screen. Furthermore, it is also acceptable if the recipients are specified at the time of script transmission.

Figure 11:
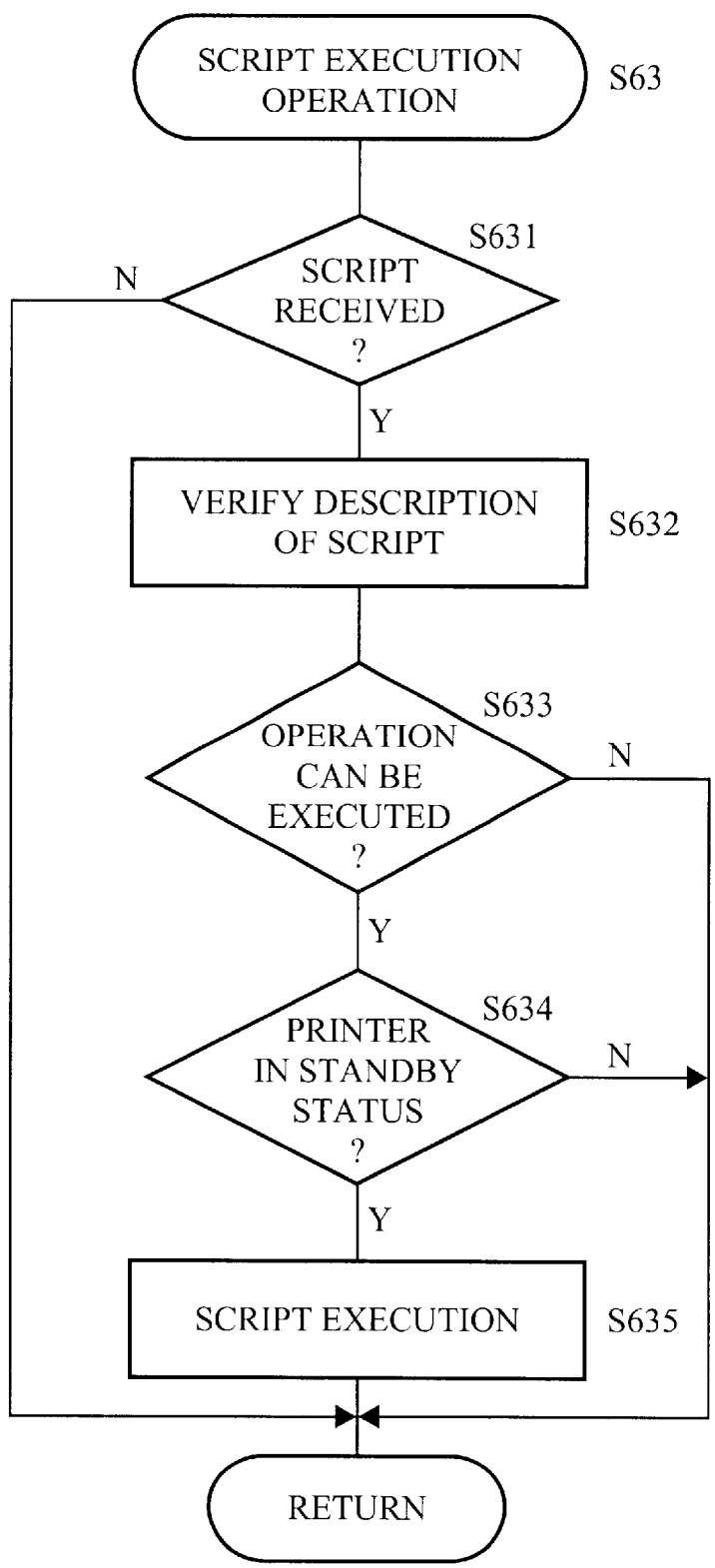
FIG. 11 is a flow chart showing the sequence of events of the script execution operation of step S63.

FIG. 11 is a flow chart showing the sequence of events of the script execution operation of step S63. This operation is executed when a script is received via the processing described above. A situation in which a script has been received from the printer 2 will be described below as an example.

As shown in the drawing, the CPU 21 determines whether or not a script has been received (step S631). In this embodiment, when a script is received, it is saved in a prescribed storage area of the EEPROM 24, and the CPU 21 determines whether or not a script has been received based on whether or not a script is saved therein.

Where it is determined that no script has been received ('N' in step 5631), the CPU 21 returns to the main routine without performing any further processing.

Where it is determined that a script has been received ('Y' in step,S631), the CPU 21 verifies the description of the script (step S632) and determines whether or not the operations described therein can be executed (step S633). Where the script describes an order to execute test printing, for example, and if a printing operation for test printing is enabled, it is determined that test printing can be carried out immediately ('Y' in step S633), and the CPU 21 returns to step S634.

On the other hand, if printing is underway, test printing cannot be carried out immediately. Therefore, the CPU 21 determines that test printing cannot be performed ('N' in step S633), and returns to the main routine. In this case, when the printing operation is finished and the CPU 21 determines that test printing can be performed ('Y' in step S633), it moves to step S634. As described above, if, where processing that relates to the description of the script is currently underway and the operations to be executed based on the script cannot be performed, such operations are prevented from being executed, and the other operations that are currently underway are not disrupted.

In step S634, it is determined whether or not the printer is in standby status. For example, where the printer is in the energy conservation state (not in standby status) ('N' in step S634), the CPU 21 determines that printing cannot be performed immediately, and returns to the main routine without performing any further processing. Processing is not performed as described above when the printer is not standing by because when test printing is forcibly performed when the temperature of the fusing device is lower than the fusing temperature, for example, the printed test pattern results in poor image quality due to insufficient fusing, which does not serve the purpose of test printing.

On the other hand, where the CPU 21 determines that the printer is in standby status ('Y' in step S634), it automatically executes the contents of the description of the received script as a maintenance operation (step S635) and returns to the main routine.

For example, where 'an order to replace the transfer voltage value' is included following 'an order to execute test printing' in the script received from the printer 2, the operation to execute test printing and the operation to replace the value currently stored in the EEPROM 24 as the transfer voltage value with the value indicated in the script are automatically executed in that order. In other words, the test printing operation and the transfer voltage setting operation executed in the printer 2 are automatically carried out in the printer 1 without the service technician performing key input. Subsequently, when the script is sent from the printer 2 to the printer 3, the same operations as executed in the printer 2 are automatically carried out in the printer 3.

As described above, according to the present invention, when a service technician performs maintenance for the printers 1 through 3, where it is necessary to perform test printing in these printers in order to check the image quality, for example, the service technician can do so simply by performing key input operations from one of the printers only. In comparison with the conventional art in which identical input operations must be performed for each printer, the amount of work and time required for the maintenance is substantially reduced.

In addition, where diagnostic adjustment is performed for each printer as in the conventional art, if there are many diagnostic adjustment tasks that must be executed, for example, the service technician may forget to perform certain tasks with respect to one or more of the printers that are the objects of the maintenance service, but according to the present invention, because the operations executed by one printer are also executed by the other printers, such omission does not take place. Furthermore, where multiple diagnostic adjustment tasks must be carried out according to a predetermined order, for example, the service technician may input them in the wrong order when manual input operations are performed for each printer as in the conventional art, but according to the present invention, such an error does not take place, and appropriate adjustment can be attained with all of the printers.

In the-script execution operation described above, the determination as to whether or not operations based on the received script are possible is made in step S633. There are situations, however, where priority should be placed on such operations in order to maintain the service technician's work efficiency, for example. A construction in which the determination is not performed in such a situation may also be used. For the same reason, the determination in step S634 as to whether or not the printer is in standby status may be eliminated as well. In this case, 'test printing', for example, cannot be executed if the printer is in the energy conservation state, but other maintenance tasks, such as 'ROM version display', that may be executed even if the printer is not standing by for printing, are carried out.

Second Embodiment

A description was provided in connection with the first embodiment using an example in which the script generated by one printer is sent to the other printers. This embodiment is different from the first embodiment in that the PC 11 is used as the administrating apparatus for the system 10, each printer sends its own internally-generated script to the PC 11, and when a script is received from one printer, the PC 11 sends it to the other printers. The second embodiment is described below with a focus on the differences from the first embodiment, and similar features are omitted from the description.

1. Operations Performed by Printer 1

The printer 1 has a different script transmission operation, which is a subroutine of the script operation, from the first embodiment.

Figure 12:
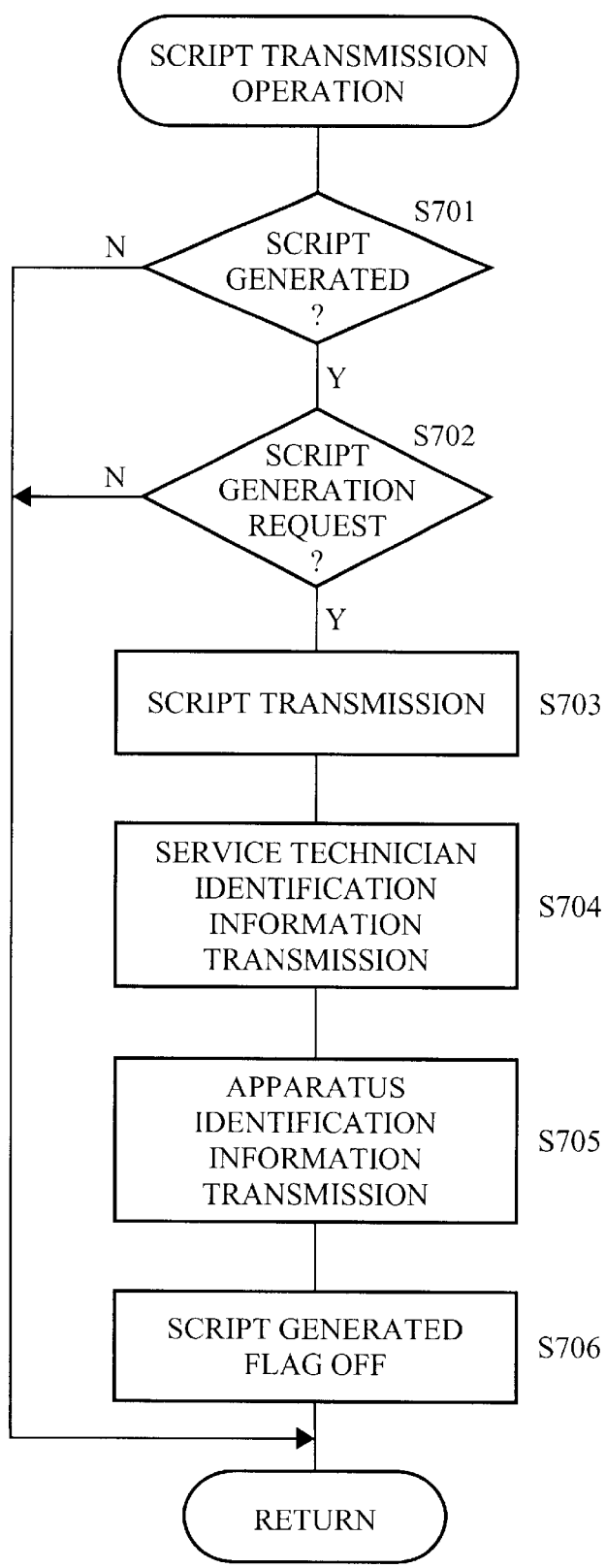
FIG. 12 is a flow chart showing the sequence of events of the script transmission operation in a second embodiment.

FIG. 12 is a flow chart showing the sequence of events of the script transmission operation in this embodiment.

As shown in the drawing, the CPU 21 determines whether or not a script has been generated, as well as whether or not a script generation request exists (steps S701 and S702). These steps are the same as steps S621 and S622 of the first embodiment.

Where it is determined that no script generation request exists ('Y' in step S702), the CPU 21 sends the generated script, the service technician identification information and the apparatus identification information to the PC 11 (steps S703, S704 and S705). Here, the service technician identification information is a number by which to identify the service technician. In this embodiment, when the diagnostic adjustment mode is active, the service technician inputs a number provided in advance as the service technician's identification number, and the number thus input is sent as the service technician identification number that indicates the identity of the service technician for the printer. The apparatus identification information is stored in the EEPROM 24 in advance at the time of shipment as a unique identification number by which to identify the printer (i.e., as an apparatus identification number). Where the script, the service technician identification information and the apparatus identification information are referred to collectively hereinafter, they will be referred to as 'the script, etc.'

After the script, etc. is sent, the CPU 21 turns OFF the script generated flag in step S706 and returns to the main routine. This step is identical to step S628.

As described above, because the script, etc. is sent to the administrating apparatus in this embodiment, the operations from step S623 in which it is verified whether recipients have been specified to step S626 in which it is determined whether or not transmission is permitted, as well as the operations of step S629 in which the script is discarded, are not performed.

2. Operations Performed by PC 11 (Administrating Apparatus)

Figure 13:
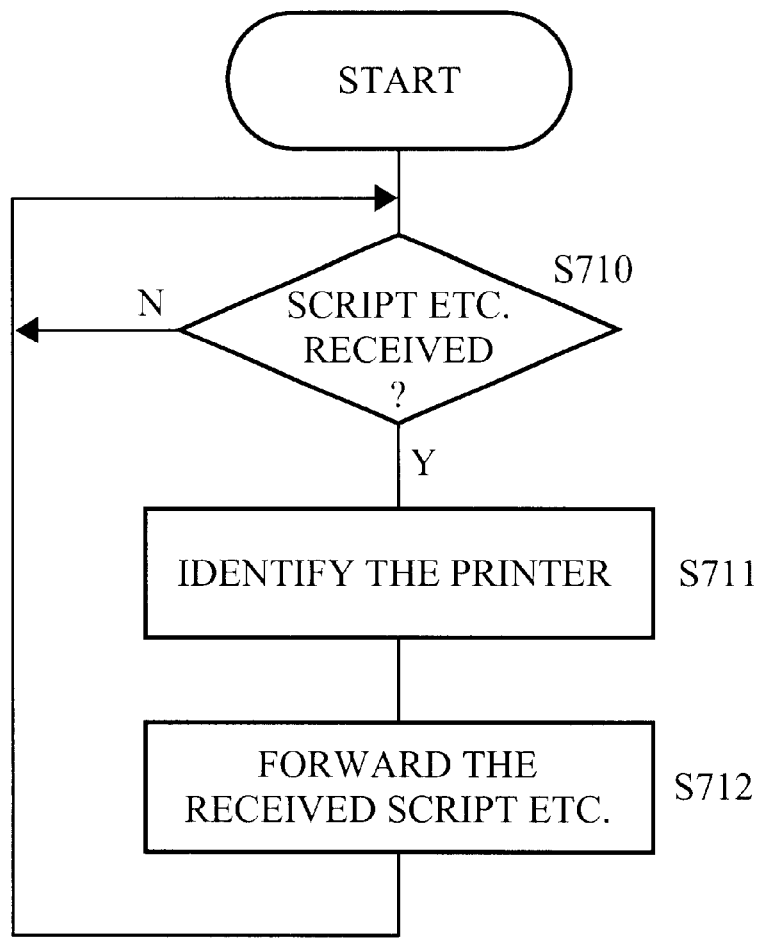
FIG. 13 is a flow chart showing the sequence of the operations executed by the PC 11 when a script, etc., is received from a printer.

FIG. 13 is a flow chart showing the sequence of the operations performed by the PC 11 when a script, etc. is received from a printer.

As shown in the drawing, the CPU 111 of the PC 11 first determines whether or not a script, etc. has been received from any of the printers (step S710). When it is determined that a script, etc. has been received, it then identifies with reference to the apparatus identification information the printer from which it was received (i.e., the sending printer) (step S711).

The CPU 111 performs processing to forward the received script, etc. to the printers other than the sending printer (step S712) and returns to step S710.

In this case, each printer that received the script, etc. executes maintenance tasks based on the description of the script in the script execution operation of step S63, as in the case of the first embodiment, such that the effect of enabling the amount of work, etc. required for such maintenance to be reduced is obtained in the same way as the first embodiment.

Figure 14:
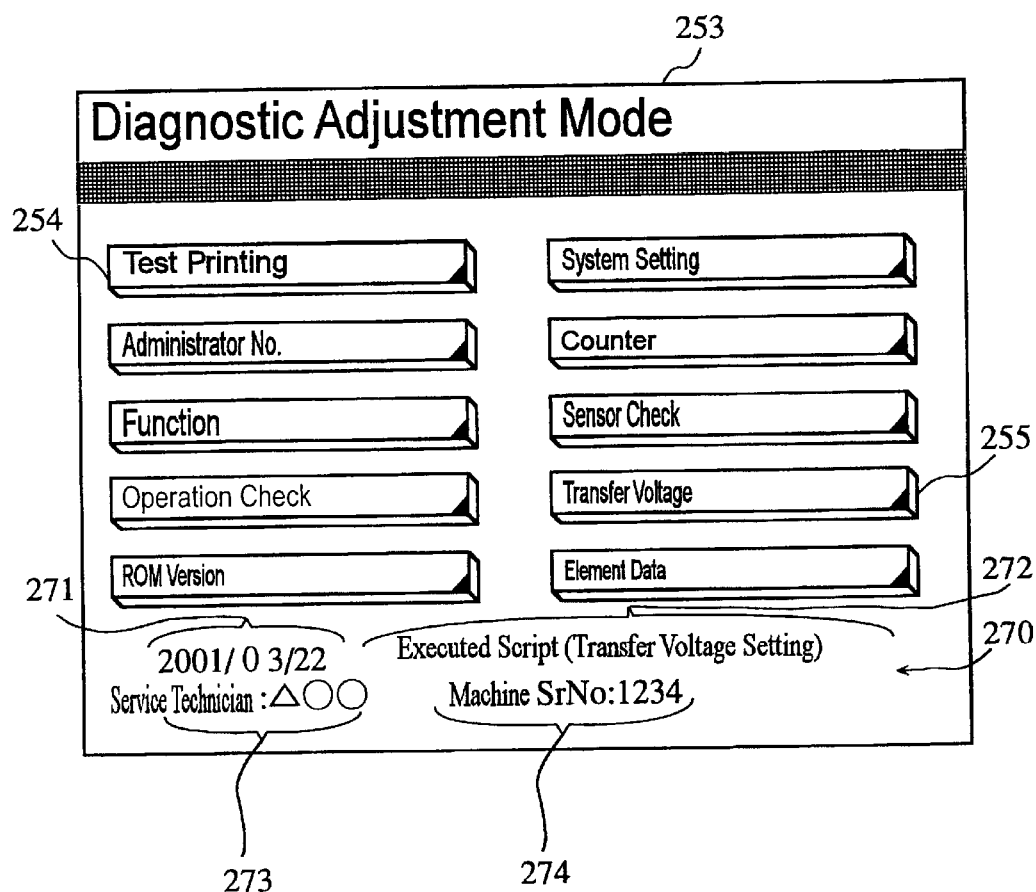
FIG. 14 is a drawing showing an example of another menu screen when the diagnostic adjustment mode is activated.

In addition, in this embodiment, after a script is executed, the date of execution 271, the executed diagnostic adjustment task name 272, the service technician name 273 and the apparatus identification number 274 are displayed in the bottom area 270 of the diagnostic adjustment mode menu screen, as shown in FIG. 14.

The diagnostic adjustment task name 272 is determined from the description of the script received, and the apparatus identification number 274 is determined from the apparatus identification information.

The service technician name 273 is determined from the service technician identification information. In this example, a service technician management table (not shown) that associates the names and identification numbers of all service technicians authorized to perform maintenance service regarding the printers 1 through 3 is stored beforehand in the fixed storage device 114 of the PC 11. The CPU 111 reads out the service technician name that corresponds to the received service technician identification number from the service technician management table and causes it to be displayed.

Therefore, for example, if a diagnostic adjustment task name 272 is being displayed in the bottom area 270 when a different service technician causes the diagnostic adjustment mode menu screen to be displayed with the intention of performing servicing of the printer 1 after automatic execution of maintenance work based on a script received from another printer, that service technician can determine that some processing has already been performed regarding that maintenance task. For example, if that service technician determines that the displayed service technician name 273 represents a person more experienced than himself or herself, he or she may determine that it is not necessary to verify or execute the diagnostic adjustment task that was automatically executed. Alternatively, where the service technician determines that the maintenance task was executed by a service technician who is much less experienced, he or she may determine that the maintenance task must be reverified.

Because the state of the maintenance service automatically executed can be learned in this way, the present invention enables maintenance service to be performed more appropriately and efficiently. While the executed diagnostic adjustment tasks and other information are displayed in the bottom area 270 of the menu screen in this example, it is also possible to print out this information on a sheet of paper, for example.

Third Embodiment

In the second embodiment described above, upon the receipt of a script, etc. from a printer, the PC 11, which serves as an administrating apparatus, forwards the script, etc. to the other printers. In this embodiment, when a script, etc. is received from a printer, it is determined based on the skill of the service technician who conducted the maintenance service on that printer whether or not the script, etc. should be forwarded to the other printers. This is the difference of this embodiment from the second embodiment. The third embodiment is described below with a focus on the differences, which comprise the operations performed by the PC 11, relative to the second embodiment, and similar features are omitted from the description.

Figure 15:
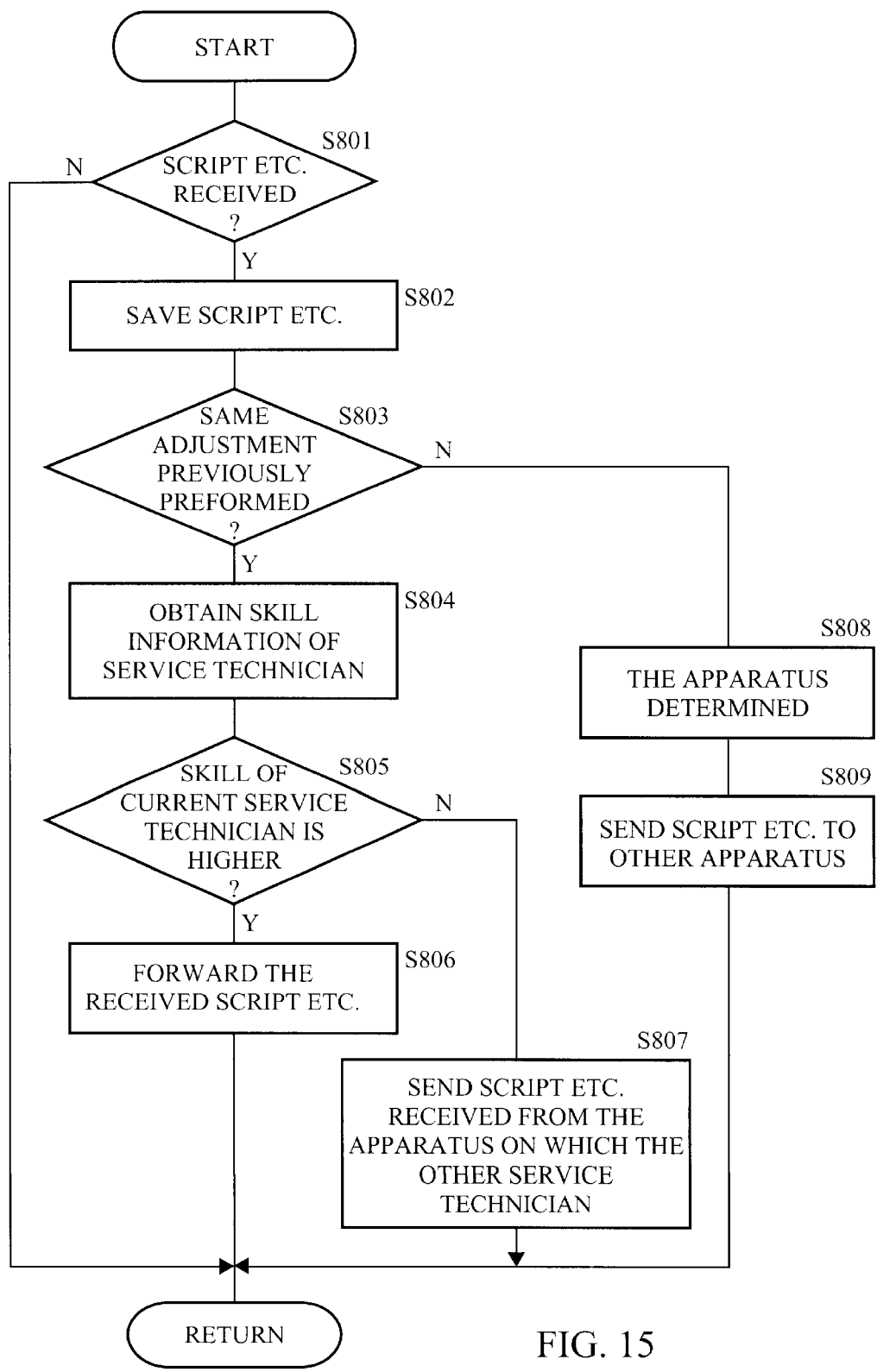
FIG. 15 is a flow chart showing the sequence of the operations executed by the PC 11 pertaining to a third embodiment when a script, etc., is received from a printer.

FIG. 15 is a flow chart showing the sequence of the operations performed by the PC 11 of this embodiment when a script, etc. is received from a printer.

As shown in the drawing, the CPU 111 of the PC 11 first determines whether or not a script, etc. has been received from any printer (step S801). A situation in which a script, etc. has been received from the printer 2 is described below as an example.

When it is determined that a script, etc. has been received from the printer 2, the CPU 111 associates the script, the service technician identification information and the apparatus identification information and saves them in a script management table 116 in the fixed storage device 114 (step S802).

Figure 16:
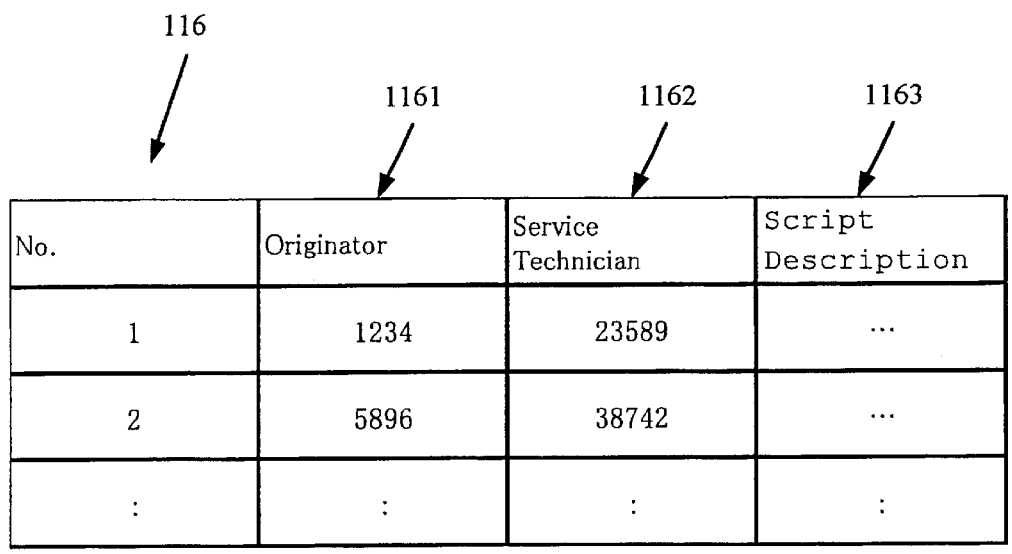
FIG. 16 is a drawing showing a script management table 116.

FIG. 16 is a drawing showing the script management table 116.

As shown in the drawing, the script management table 116 comprises an originator column 1161, a service technician column 1162 and a script description column 1163. The printer identification number, which serves as the apparatus identification information, is written and saved in the originator column 1161. The service technician identification number, which serves as the service technician identification information, is written and saved in the service technician column 1162. The description of the script is written and saved in the script description column 1163. Each time a script, etc. is received from a printer, a record regarding that printer is added to this script management table 116.

Returning to FIG. 15, the CPU 111 determines from the description of the script received the diagnostic adjustment task that was performed on the printer 2, and then further determines whether or not such a task was previously performed (step S803). This determination is made by referring to the contents written in the script description column 1163 of the script management table 116. Where it is determined that a printer exists regarding which the same diagnostic adjustment task was previously performed ('Y' in step S803), the CPU 111 moves to step S804.

The CPU 111 obtains the information regarding the skill of the service technician who performed the diagnostic adjustment task on the printer 2 (hereinafter referred to as 'the current service technician') and the information regarding the skill of the service technician who performed the same diagnostic adjustment task on the other printer prior to the service-performed on the printer 2 (hereinafter referred to as 'the other service technician'). In this example, a value that indicates each service technician's skill level (i.e., a value that is determined by considering the number of years of experience as a service technician, accomplishments, the depth of knowledge regarding diagnostic adjustment service, etc.) is stored in a skill management table (not shown) in the fixed storage device 114 of the PC 11 in advance for all of the service technicians authorized to perform maintenance service on the printers 1 through 3, in association with the service technician identification number. The CPU 111 identifies the current service technician and the other service technician by referring to the service technician column 1162, and obtains the information regarding the skill of each service technician by referring to the skill management table.

Where it is determined through the comparison of the skill of each service technician that the skill of the current service technician (who conducted maintenance service on the printer 2) is higher ('Y' in step S805), the CPU 111 forwards the script, etc. received from the printer 2 to the other printers, i.e., the printer 1 and the printer 3 (step S806), and returns to step S801.

On the other hand, where it is determined that the skill of the current service technician is lower than (or identical to) that of the other service technician, i.e., where it is determined that the skill of the other service technician is higher ('N' in step S805), the CPU 111 sends to the printer 2 the script that was received from the printer on which the other service technician previously conducted diagnostic adjustment and that is written in the script description column 1163 of the script management table 116 (step S807), and returns to step S801.

For example, where a service technician B conducted 'transfer voltage setting' on the printer 2 after a different service technician A carried out 'transfer voltage setting' on the printer 3, and (1) where it is determined that the skill of the service technician B is higher, the script describing an order to replace the transfer voltage value is forwarded from the printer 2 to the printers 1 and 3. In this case, upon receiving the script from the PC 11, the printers 1 and 3 perform 'transfer voltage setting' based on the information contained therein as described above.

On the other hand, contrary to the case (1), (2) where it is determined that the skill of the service technician B is lower than (or identical to) that of the service technician A, the script, etc. that was received from the printer 2 is not forwarded to the printers 1 or 3, and the script generated via the 'transfer voltage setting' previously performed by the service technician A on the printer 3 is sent back to the printer 2. In this case, although 'transfer voltage setting' has already been performed by the service technician B on the printer 2, upon the receipt from the PC 11 of the script (describing an order to replace the transfer voltage value) generated by the printer 3, the printer 2 repeats 'transfer voltage setting' based on the description thereof in the script execution operation of step S63. As described above, in either of case (1) or (2), the same voltage value is set in the printers 1, 2 and 3 via the 'transfer voltage setting'.

At the same time, where it is determined that the identical diagnostic adjustment task has not been performed in the past ('N' in step S803), the CPU 111 returns to step S808.

In step S808, the printer from which the script, etc. was received is determined, and in step S809, the processing to send the script, etc. to other printers (the printers 1 and 3 in the example above) is executed, and the CPU 111 returns to step S801. Steps S808 and S809 are identical to the steps S711 and S712 described above.

As described above, in this embodiment, a script that describes maintenance tasks performed by a service technician having a higher skill level is sent to the other printers such that the maintenance tasks conducted by that service technician are carried out in the same fashion regarding the other printers as well. Consequently, image quality is maintained at a high level in each printer.

In this embodiment, the determination of whether or not a script, etc. received by the PC 11 should be forwarded to the other printers is based on the results of a comparison of the relative skill levels of multiple service technicians. It is also acceptable if the acceptable minimum level of skill that permits forwarding of a script to the other printers is specified as a prescribed level, and the PC 11 executes, in place of the operations of step S805, the processing to move to step S806 when the skill level of the service technician who conducted the maintenance work is higher than the prescribed level. Where the skill of the service technician is evaluated in absolute terms in this manner, maintenance service by an experienced service technician having a skill level higher than a prescribed level is executed in the same way regarding the other printers as well. In other words, because maintenance service by a service technician having a skill level lower than the prescribed level is never carried out on any of the other printers, image quality can be maintained at a high level throughout the system.

Fourth Embodiment

This embodiment differs from the first embodiment in that the printer in the first embodiment executes the processing performed in the script transmission operation by the PC 11 in the third embodiment (the operation in which it is determined based on the skill of the service technician whether or not the script, etc. should be forwarded). A description is provided below with a focus on the differences therefrom, and elaboration of the same features is not provided. In this embodiment, the service technician inputs the number that is provided beforehand as his or her identification number when the diagnostic adjustment mode is activated, and a script management table 116 similar to that described above (but lacking an originator column 1161) and a management table similar to the skill management table are stored in the EEPROM 24 of the printer.

Figure 17A:
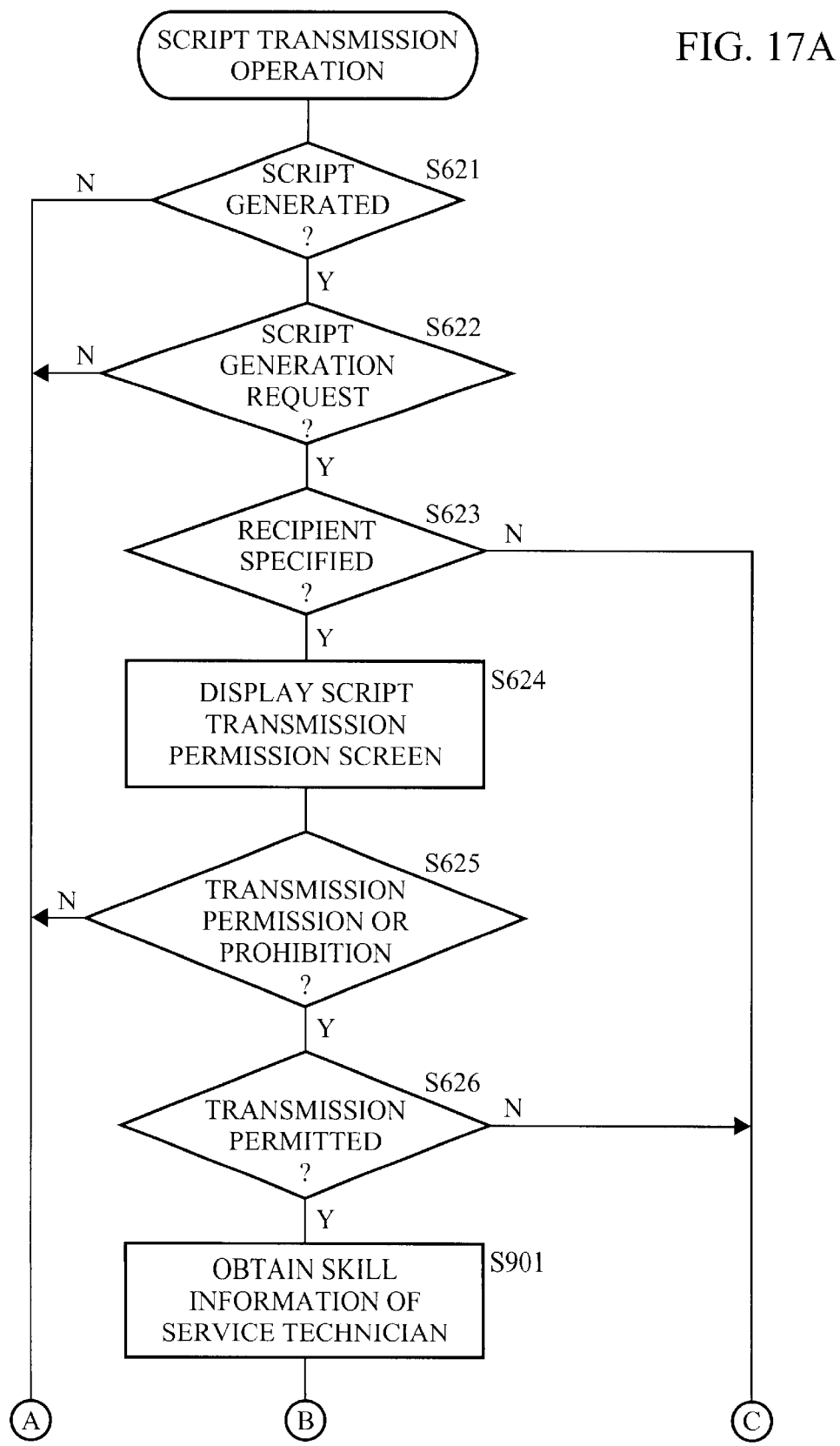
FIG. 17 is a flow chart showing the sequence of events of the script transmission operation executed by the printer pertaining to the third embodiment.
Figure 17B:
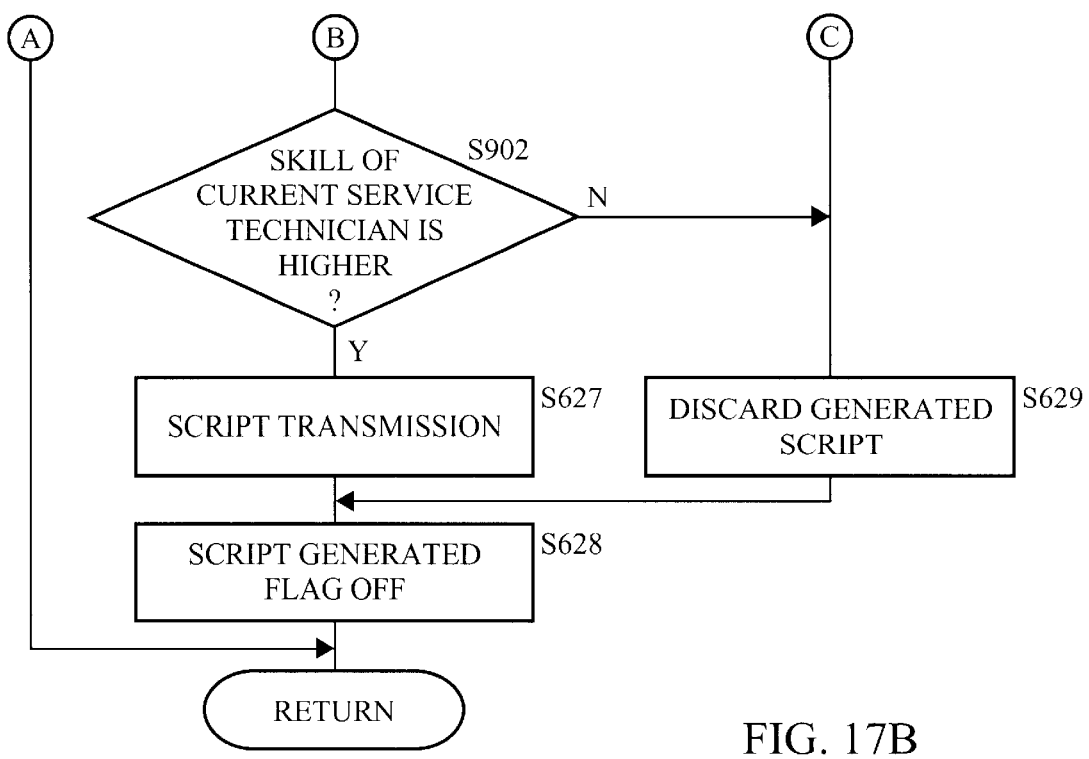

FIG. 17 is a flow chart showing the sequence of events of the script transmission operation performed by the printer of this embodiment.

As shown in the drawing, this operation is almost identical to the script transmission operation (FIG. 9) of the first embodiment, except that steps S901 and S902 are inserted between steps S626 and S627. The step S901 is identical to the step S804 described above. In this step, information is obtained regarding the skill level of the current service technician and the service technicians who previously performed maintenance service on the same printer by referring to the skill management table and the service technician column 1162 of the script management table 116 stored in the EEPROM 24.

Where it is determined that the skill level of the current service technician is the highest among the service technicians who have performed maintenance service ('Y' in step S902), the generated script is sent to the other printers (step S627). On the other hand, where it is determined the skill level of a service technician who has previously performed maintenance service is higher ('N' in step S902), the generated script is discarded (step S629), and the CPU 111 returns to the main routine.

As described above, in this embodiment, only where the skill level of the current service technician is higher than the skill levels of any of the service technicians who have carried out maintenance service in the past on the same printer, the script that describes the current maintenance service is sent to the other printers. Therefore, as in the third embodiment, not only can the amount of maintenance work conducted by the service technician can be reduced relative to the conventional art, but the image quality, etc. of the entire system can be maintained at a high level.

In addition, if the minimum skill level that permits script transmission to the other printers is set in advance, it is possible to execute processing to move to step S627 when it is determined that maintenance service has been performed by a service technician having a skill higher than that level, and to execute processing to move to step S629 when it is determined that the skill of the service technician does not reach that level, in place of the operations of step S902.

Modifications

Embodiments of the present invention were described above, but the present invention is not limited thereto. Modifications described below are also possible.

(1) While examples in which maintenance tasks are executed when the diagnostic adjustment mode is activated were described in connection with the above embodiments, the present invention is not limited thereto. For example, setting or selection tasks performed by the user via key operation while the user acts as the maintenance service technician, such as the setting of a period after the expiration of which the printer enters the energy conservation state (hereinafter referred to as the energy conservation state shift period), the setting of printing density, selection as to whether priority should be placed on letter images or photo images and selection of the type of paper to place in the printer, can be deemed as maintenance tasks.

For example, if, where the user sets the energy conservation state shift period in the printer 1, the script that describes an order to set such period is sent from the printer 1 to the other printers 2 and 3, such that the printers 2 and 3, which receive the script, set for themselves the same energy conservation state shift period used by the printer 1 based on that order, the same effect as that described above, i.e., the effect that the work and time required for one user to carry out key input operations to set the energy conservation state shift period in each printer are reduced, can be obtained.

(2) A system in which multiple printers are connected to a LAN 5 was described as an example in connection with the embodiments described above, but the present invention is not limited to printers, and can be generally applied in image forming apparatuses including copying machines and scanners. In addition, a situation in which printers having the same construction are connected was described, but the printers may have difference constructions as long as they can perform maintenance service based on the received script.

(3) The present invention is not limited to image forming apparatuses such as the printers described above, but may be an image forming system comprising multiple types of image forming apparatuses connected to a network such as a LAN, and a method by which each image forming apparatus of such system executes the operations described above. It may also be an image forming system in which multiple types of image forming apparatuses and administrating apparatuses comprising PC's are connected to a network, and a method by which each image forming apparatus and administrating apparatus in such system executes the operations described above. Furthermore, the present invention may also be a program that causes the computer to carry out the applicable method.

The present invention may also be such program recorded on a computer-readable recording medium such as a flexible disk, a hard disk, a CD-ROM, an MO disk, a DVD, a DVD-ROM, a DVD-RAM or a semiconductor memory.

Furthermore, the program of the present invention need not include all of the modules by which to cause the computer to execute the operations described above, and it is also acceptable if each operation of the present invention is executed by the computer by using various general-purpose programs that may be separately installed, such as a communication program and programs included in the OS (operating system).

As described above, because the maintenance method of the present invention includes a receiving step in which the first image forming apparatus receives input operations for maintenance purposes from the service technician; a first execution step in which maintenance work for the first image forming apparatus is executed based on the contents of the received input operations; a generation step in which an order is generated that indicates that the same maintenance work as that performed based on the contents of the received input operations should be executed; a transmission step in which the generated order is sent to the second image forming apparatus; and a second execution step in which when the order sent from the first image forming apparatus is received by the second image forming apparatus, the same maintenance work as that performed by the first image forming apparatus is executed based on such order, the maintenance work performed regarding one image forming apparatus is automatically performed regarding a different image forming apparatus, thereby reducing the amount of work and time required for key input in comparison with the conventional art.

Furthermore, because the present invention is an image forming apparatus included in an image forming system comprising multiple image forming apparatuses connected over a network, such apparatus including receiving means to receive input operations for maintenance purposes from the service technician; first executing means to execute maintenance work based on the contents of the received input operations; generating means to generate an order that indicates that the same maintenance work as that performed based on the contents of the received input operations should be performed; transmitting means to send the generated order to the other image forming apparatuses; and second executing means to execute, upon the receipt of an order sent from one of the other image forming apparatuses, the same maintenance work as that performed by that image forming apparatus based on such order, the maintenance work performed regarding one image forming apparatus is automatically carried out regarding the other image forming apparatuses as well, resulting in a reduction in the amount of work and time required for key input in comparison with the conventional art.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A maintenance method for an image forming system including first and second image forming apparatuses connected over a network, said maintenance method comprising:

a receiving step in which the first image forming apparatus receives input operations for maintenance purposes from the service technician;

a first execution step in which maintenance work for the first image forming apparatus is executed based on the contents of the received input operations;

a generation step in which an order is generated that indicates that the same maintenance work as that performed based on the contents of the received input operations should be executed;

a transmission step in which the generated order is sent to the second image forming apparatus; and a second execution step in which, when the order sent from the first image forming apparatus is received by the second image forming apparatus, the same maintenance work as that performed by the first image forming apparatus is executed based on such order.

2. A maintenance method as claimed in claim 1, wherein the maintenance work is executed in the second execution step when the image forming apparatus is in standby status.

3. A maintenance method as claimed in claim 1, wherein the maintenance work is executed in the second execution step when no processing that relates to maintenance servicing is being performed.

4. A maintenance method as claimed in claim 1, wherein the generated order is sent to the second image forming apparatus in the transmission step when the second image forming apparatus is specified as a recipient.

5. A maintenance method as claimed in claim 1, further comprising:

an obtaining step in which information regarding the skill of the service technician for the current maintenance session and the skill of the service technician for the previous maintenance session is obtained, both of the maintenance sessions having been performed regarding the first image forming apparatus; and a determination step in which it is determined whether or not the service technician for the current maintenance session has superior skill to the service technician for the previous maintenance session be included, wherein the order is sent to the second image forming apparatus in the transmission step when it is determined that the service technician for the current maintenance session has a higher level of skill than the service technician for the previous maintenance session.

6. A maintenance method for an image forming system including an administrating apparatus, a first image forming apparatus and a second image forming apparatus connected over a network, said maintenance method comprising;

a receiving step in which the first image forming apparatus receives input operations for maintenance purposes from the service technician;

a first execution step in which maintenance work for the first image forming apparatus is executed based on the contents of the received input operations;

a generation step in which an order is generated that indicates that the same maintenance work as that performed based on the contents of the received input operations should be executed;

a transmission step in which the generated order is sent to the administrating apparatus;

a forwarding step in which, when the order is received from the first image forming apparatus, the administrating apparatus sends such order to the second image forming apparatus; and a second execution step in which, when the order is received from the administrating apparatus, the second image forming apparatus executes the same maintenance work as that performed by the first image forming apparatus based on such order.

7. A maintenance method as claimed in claim 6, further comprising:

an identification information receiving step in which the first image forming apparatus receives input of the information that identifies the service technician;

an identification information sending step in which such service technician identification information is sent to the administrating apparatus, and an output step in which the description of the service technician identification information sent from the administrating apparatus is output by the second image forming apparatus be included, wherein the service technician identification information is sent to the second image forming apparatus together with the order from the first image forming apparatus in the forwarding step.

8. A maintenance method as claimed in claim 6, further comprising:

an obtaining step in which the administrating apparatus obtains information regarding the skill of the service technicians for first and second image forming apparatus; and a determination step in which it is determined which of service technicians has superior skill, wherein the order is sent to the second image forming apparatus in the transmission step when it is determined that the service technician for the first image forming apparatus has a higher level of skill.

9. A maintenance method as claimed in claim 6, further comprising:

an obtaining step in which the administrating apparatus obtains information regarding the skill of the service technician for the first image forming apparatus; and a determination step in which it is determined whether the service technician has a skill level higher than a prescribed level, wherein the order is sent to the second image forming apparatus in the transmission step when it is determined that the service technician has a skill level higher than the prescribed level.

10. An image forming apparatus in an image forming system including a plurality of image forming apparatuses connected over a network, said image forming apparatus comprising:

receiving means for receiving input operations for maintenance purposes from the service technician;

first execution means for executing a maintenance work based on the contents of the received input operations;

generation means for generating an order that indicates that the same maintenance work as that performed based on the contents of the received input operations should be executed;

transmission means for sending the generated order to an other image forming apparatus; and a second execution means for executing the same maintenance work as that performed by the image forming apparatus based on such order when the order sent from an other image forming apparatus is received.

* * * * *